US012583242B2

(12) United States Patent
Alarcón Cano et al.

(10) Patent No.: US 12,583,242 B2
(45) Date of Patent: Mar. 24, 2026

(54) PRINT MEDIA TENSION

(71) Applicant: Hewlett-Packard Development Company, L.P., Spring, TX (US)

(72) Inventors: Alejandro Alarcón Cano, Sant Cugat del Valles (ES); Alexandre Rodriguez Llofriu, Sant Cugat del Valles (ES); Andrés Cano De La Fuente, Sant Cugat del Valles (ES)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 364 days.

(21) Appl. No.: 18/259,527

(22) PCT Filed: Jan. 27, 2021

(86) PCT No.: PCT/US2021/015154
§ 371 (c)(1),
(2) Date: Jun. 27, 2023

(87) PCT Pub. No.: WO2022/164424
PCT Pub. Date: Aug. 4, 2022

(65) Prior Publication Data

US 2024/0059083 A1 Feb. 22, 2024

(51) Int. Cl.

*B41J 15/16* (2006.01)
*B65H 23/04* (2006.01)
*B65H 23/185* (2006.01)

(52) U.S. Cl.

CPC .......... *B41J 15/165* (2013.01); *B65H 23/044* (2013.01); *B65H 23/185* (2013.01); *B65H 2801/03* (2013.01)

(58) Field of Classification Search

CPC .... B41J 15/165; B65H 23/044; B65H 23/185; B65H 2801/03
See application file for complete search history.

(56) References Cited

U.S. PATENT DOCUMENTS

| | | | | |
|---|---|---|---|---|
| 3,452,945 | A | 7/1969 | Viegas | |
| 7,982,758 | B2 | 7/2011 | Marcus et al. | |
| 9,296,228 | B2 | 3/2016 | Regelsberger et al. | |
| 2009/0302145 | A1 | 12/2009 | Dejong et al. | |
| 2014/0232776 | A1* | 8/2014 | Niertit | B41J 15/16 347/16 |
| 2015/0210096 | A1 | 7/2015 | Studer et al. | |
| 2019/0092060 | A1 | 3/2019 | Costal et al. | |

FOREIGN PATENT DOCUMENTS

| | | |
|---|---|---|
| JP | 2002-172761 A | 6/2002 |
| JP | 2020-070150 A | 5/2020 |

* cited by examiner

*Primary Examiner* — Henok D Legesse
(74) *Attorney, Agent, or Firm* — Jordan IP Law, LLC

(57) ABSTRACT

In one example, the tension in a print media may be determined in a region between a roller for unwinding the print media and a print zone. In this example, the rotational speed of the roller may be controlled based on the determined tension of the print media.

13 Claims, 6 Drawing Sheets

200

PRINT MEDIA TENSION

BACKGROUND

In an example print apparatus, a print media may be advanced toward a print zone at which an image may be transferred to the print media by the deposition of printing fluid.

BRIEF DESCRIPTION OF DRAWINGS

Examples will now be described, by way of non-limiting example, with reference to the accompanying drawings, in which.

DETAILED DESCRIPTION

Figure 1:
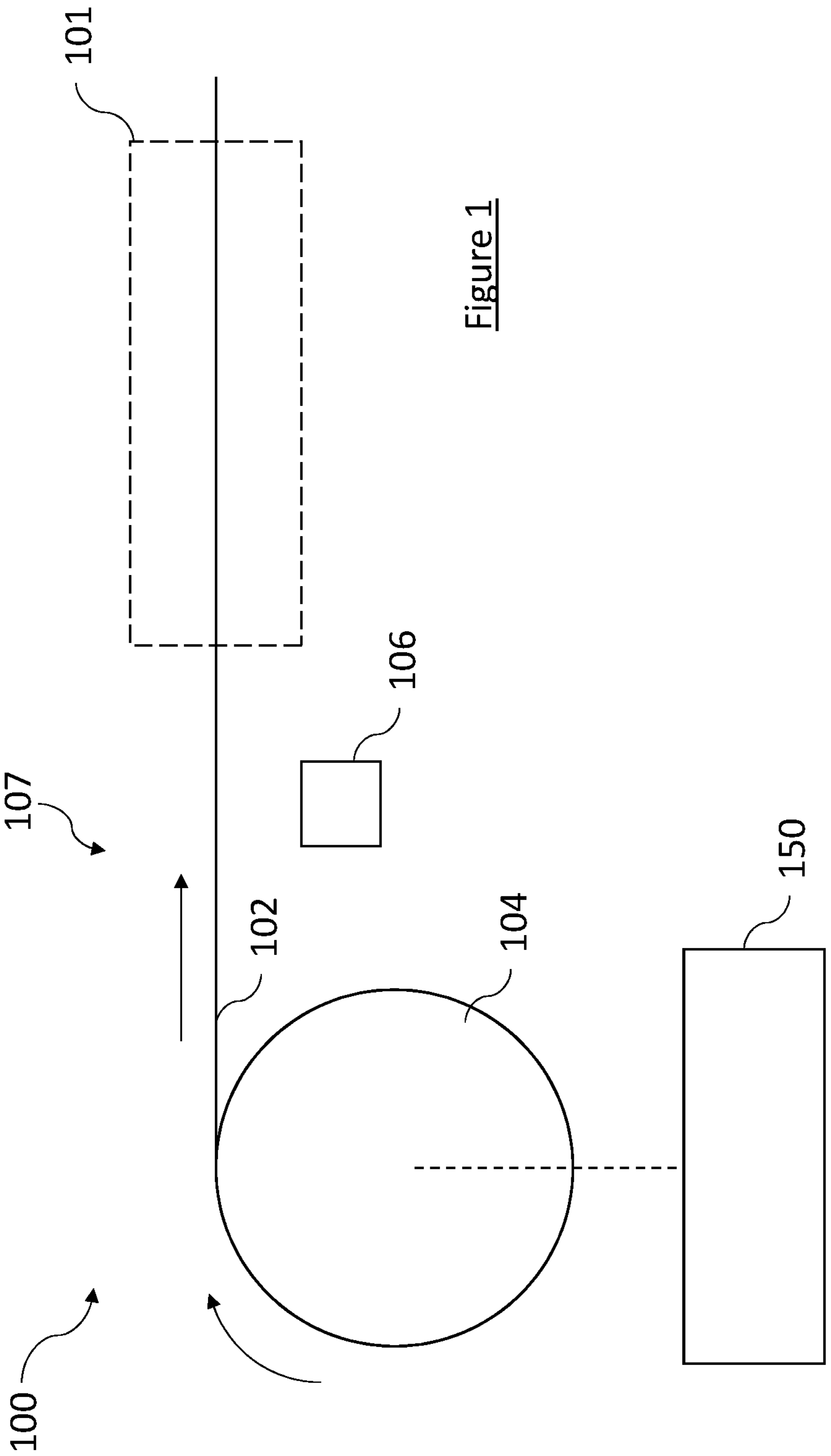
FIG. 1 is a simplified schematic of an example print apparatus.

In some print apparatuses, a print media (or substrate) is wound around a roller, termed an unwind roller, which, during the course of a print operation, is rotated to release the print media as the print media is advanced toward a print zone, for example by a print zone roller (sometimes termed a grit roller). At the print zone, an image may be formed onto the print media, for example, by causing a printing fluid (such as an ink) to be deposited onto the print media (for example according to instructions executable by a processor of the print apparatus). In the region between the unwind roller and the print zone the print media is at a tension which may be subject to change. For example, if an increase in speed and/or acceleration is instructed for a particular printing operation then the print media may be subject to a high tension force. The print media tension may also change during a print job even if there aren't any speed or acceleration adjustments. The tension of the print media should be maintained to a target, or setpoint, value (e.g. within a tolerance of such a value) or be maintained within a target, or setpoint, range of tensions. Such a target, or setpoint, value or range of values represents an acceptable tension, or range of tensions, for the print media. If the tension of print media, before the media advances to the print zone, and therefore before it is printed on, is not within a tolerance of such a setpoint, or is outside of such a range, then there could be image quality defects in the final printed media since the distance advanced by the media is (inversely) proportional to the media tension. The tension of the media in the region between the unwind roller and the print zone is referred to as the "back-tension" of the media.

Therefore, an unacceptable media back-tension could result in the media sliding, e.g. along a print platen or along a print zone roller to advance the media, media wrinkles, carriage smears, or the media getting jammed. Furthermore, maintaining an unacceptable media back-tension (e.g. if an incorrect unacceptable media tension is not corrected for) can result in banding errors. For example, if the back-tension is less than a target tension (or range) then the media will over-advance which could create print quality defects such as white-line banding (where the final image is broken up by horizontal white lines). On the other hand, if the back-tension is greater than a target tension (or range) then the media will under-advance which could create print quality defects such as dark banding (where the final image contains dark horizontal lines).

According to some examples herein, the back-tension of the print media (e.g. the media tension in the region between the unwind roller and the printzone) is measured and may be corrected for in real time or near real-time by adjusting the rotational speed of the unwind roller letting out the print media. In this way, some examples herein relate to a closed-loop process where the current back-tension of the media is measured and fed into a controller that controls the rotational speed of the unwind roller. In this way, the speed of the unwind roller (and therefore the back-tension) can be controlled in real-time or near real-time based on the current tension of the media, which may be considered a feedback signal for the closed-loop process.

According to some examples, a sensor is to determine a quantity proportional to, or indicative of, the back-tension of the media. In some examples the sensor is disposed in a region between the unwind roller and the printzone. This may be a region of the media path where the media changes direction. As the media changes direction, it will exert a force onto a portion of the print apparatus (e.g. a platen thereof). By placing the sensor at a location where the media changes direction the sensor may be placed to measure this force applied by the media, although, in some examples, the sensor may be to measure the force applied by the media in the region where it changes direction without being placed in this region. Any force applied by the media, e.g. in this region, will vary with, and will therefore be proportional to, the tension of the media. As will be discussed below in relation to FIG. 2, the force applied by the media will be perpendicular to the media (and the direction of travel thereof). Hence, at a location where the media changes direction the media will exert a force onto a portion of the print apparatus which is proportional to its tension and by placing a sensor at this location the sensor may react to the applied force to determine a measurement that is indicative of the media tension. The sensor may therefore comprise a load sensor to determine a force that the media exerts onto the print apparatus and, in some examples, the force exerted by the media onto the print apparatus may be translated into a force on the sensor. The sensor may comprise a transducer, for example a force transducer and may comprise a circuit such as a Wheatstone bridge. Therefore, the sensor in some examples is to convert mechanical energy to electrical energy, in the form of a voltage signal. A controller may convert the sensor measurement (e.g. a voltage signal) into a tension reading. In other words, the load sensor may provide a voltage signal which may vary in accordance with a force applied to the sensor (e.g. by the print media). By comparing the tension reading to a stored tension or range of tensions an 'error' may be determined, being the difference between the current media tension and stored tension or range. Based on this error, a correction to the voltage (at which a motor driving the unwind roller operates) may be calculated and applied, which achieves consequential changes in the rotational speed of the unwind roller and therefore the tension of the print media. For this purpose, according to some examples a proportional-integral-derivative (PID) controller may be used to calculate voltage and/or speed adjustments based on the error and/or the current media tension and/or a target tension or range. The controller may be part of a servomotor controlling the unwind roller and therefore some examples herein relate to using a back-tension servo control to obtain a uniform back-tension in the print media.

FIG. 1 shows a print apparatus 100. The print apparatus 100 according to this example comprises a print zone 101 which may be a region of the print apparatus 100 at which a printing fluid (such as an ink) is to be deposited onto a print media 102 to print an image to the print media 102. The print apparatus 100 comprises an unwind roller 104. The print media 102 may be wound around the unwind roller 104, for example for storage and/or transportation. The unwind roller 104 in this example is rotatable and by rotating the unwind roller 104 in one direction, a print media 102 may be wound around, e.g. taken up by, the roller, and by rotating the unwind roller 104 in another, opposite, direction may let loose the print media 102, e.g. may unwind the print media 102 from the unwind roller 104. In this example, the unwind roller 104 is disposed such that when it rotates in the direction of the arrow, print media 102 is caused to unwind from the unwind roller 104 and therefore to advance toward the print zone 101. The unwind roller 104 may therefore be caused to rotate, e.g. under the control of a controller such as a controller of a motor or a controller which is to control the operation of a motor for the unwind roller 104.

As explained above, maintaining a control of the print media tension to within a target range, prior to the print media 102 advancing into the print zone 101, can ensure a high print quality and reduce the instances of image defects that are associated with an unacceptable (e.g. too low or too high) media tension such as banding, advance errors or wrinkling. The print apparatus 100 in this example comprises a sensor 106 that is to measure the tension of the print media 102 in a region 107 between the unwind roller 104 and the print zone 101, and a controller 150 to control the rotational speed of the unwind roller 104 based on the print media tension measured by the sensor 106. In this way, the tension of the print media 102 can be determined prior to the print media 102 advancing into the print zone 101 where a printed image may be formed thereon. In this way, adjustments to the media tension may be affected prior to the print media 102 being printed on. Therefore, as the print media 102 is released (unwound) from the roller 104 and advances toward the print zone 101, if the tension in the region 107 between the roller 104 and print zone 101 is not within a target, or setpoint, range (as determined by the sensor 106), then the controller 150 is to control the rotational speed of the roller 104, which will change the tension of the media 102 in the region 107, for example before it reaches the print zone 101 and, in this way, too-low or too-high tensions may be corrected.

For example, if, as determined by the sensor 106, the tension of the media 102 in the region 107 is too high the media 102 will be pulled to taut and this may be adjusted for, by the controller 150, by increasing the rotational speed of the roller 104 so that the media 102 is unwound faster, thereby decreasing the media tension in the region 107. On the other hand, if, as determined by the sensor 106, the tension of the media 102 in the region 107 is too low the media 102 will be slack and this may be adjusted for, by the controller 150, by decreasing the rotational speed of the roller 104 so that the media 102 is unwound slower, thereby pulling the media and increasing the media tension in the region 107.

As will be explained below with reference to FIG. 2, either the sensor 106 or the controller 150 may be to determine the media tension based on the measurements from the sensor 106. The sensor 106 may be communicably coupled to the controller 150. The sensor 106 may be to measure the tension directly, or indirectly. For example, the sensor 106 in one example may comprise a load sensor that is to sense, or determine, a force that the print media 102 applies to a portion of the print apparatus 101 (e.g. a platen of the print apparatus 100 such as an entry platen). In one example, the sensor may be to translate the force applied by the print media 102 into a voltage variation or voltage signal. Put another way, the sensor 106 in these examples may be to provide voltage variations or signals in response to an applied force, which may be a direct force from the print media or a force proportional to the force that the print media exerts onto a portion of the print apparatus 100. In this way, a force measurement from the print media 102 may be translated into a voltage at the sensor 106, and the sensor 106 may transmit this voltage signal to the controller 150. The controller 150 may convert the received voltage measurement from the sensor 106 into a tension measurement of the print media 102 in the region 107. The controller 150 may further compare this tension measurement to a stored measurement. For example, the controller 150 may compare this tension to a stored tension (e.g. predetermined tension) or a stored range of tensions (e.g. a predetermined range) to determine whether there is a difference between the tension and the stored tension, or range. The stored tension or range of tensions may represent a target, or setpoint, tension of the print media 102. Therefore, the controller 150 may determine whether the print media tension is within a tolerance of a target tension value, or is within a target range of tensions. If not, the controller 150 may adjust the rotational seed of the unwind roller 104 to affect real-time changes in the media tension. In some examples, the rotation of the unwind roller 104 may be controlled by a motor, for example a servomotor (e.g. a rotation servo) which may (as will be described below) comprise a PID controller.

Figure 2:
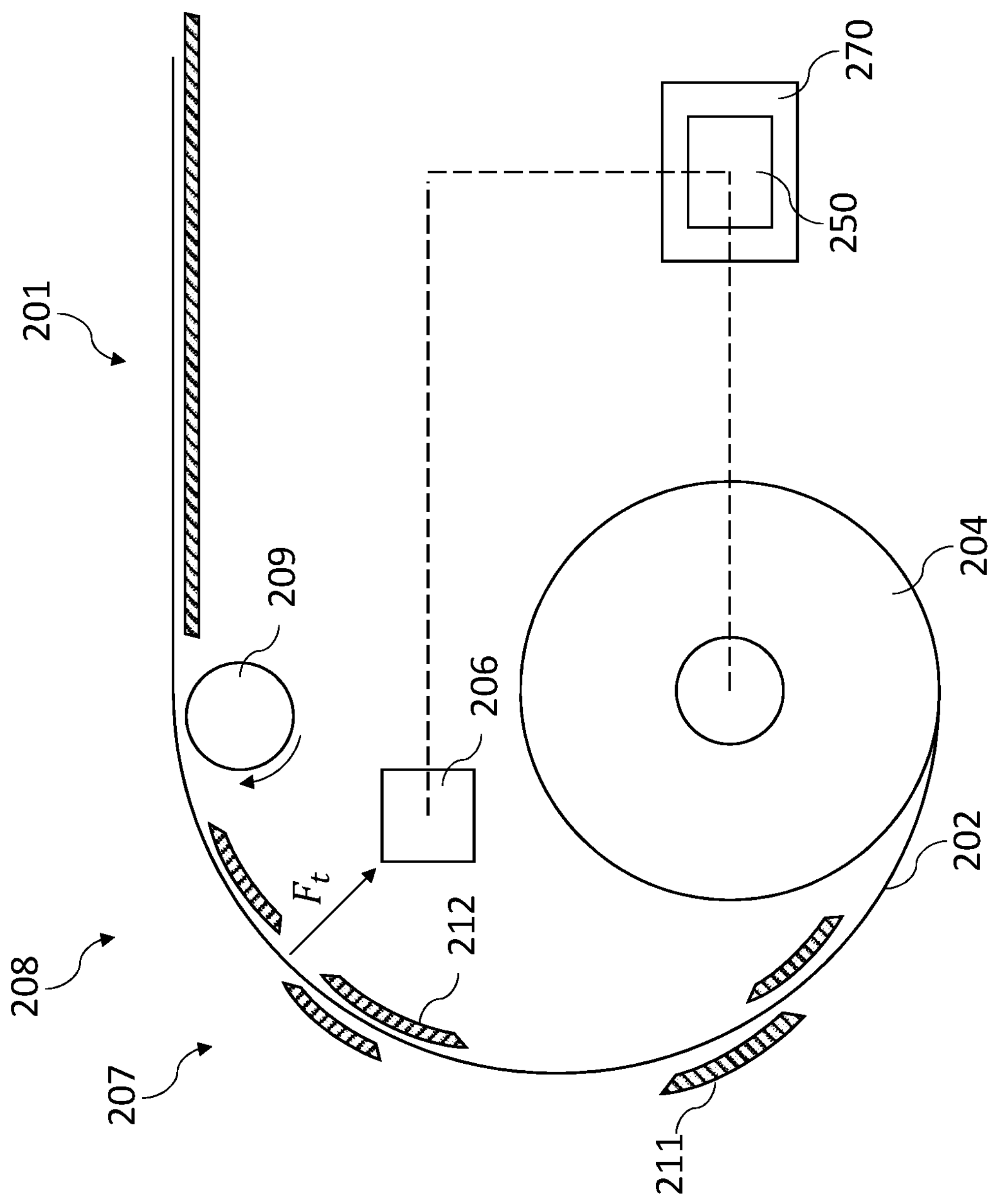
FIG. 2 is a simplified schematic of an example print apparatus.

FIG. 2 shows another example print apparatus 200, which may comprise the print apparatus 100 of the FIG. 1 example. As for the print apparatus 100, the print apparatus 200 comprises a print zone 201, a rotatable unwind roller 204 to unwind a print media 202 toward the print zone 201, a sensor 206 to measure the tension of the print media 202 in a region 207 between the unwind roller and the print zone 201, and a controller 250 to control the rotational speed of the unwind roller 204 based on the print media tension measured by the sensor 206. The print apparatus 200 comprises a print zone roller 209 (or grit roller) to advance or drive the print media 202 toward, or into, the print zone 201. As indicated by the arrow, the print zone roller 209 is rotated to advance print media 202 toward the print zone 201. In this example the print apparatus 200 comprises portions 211. These portions 211 may be any part of the print apparatus 200 hardware, e.g. housing, shell, casing or a portion of another component or components, some of which may be to guide the print media 202 on a print media path, and/or may comprise a platen of the print apparatus such as an entry platen or media platen. A print apparatus according to this example may comprise any number of such portions 211. By 'print media path' it is meant the path along which the print media 202 advances, e.g. during a print operation, through a portion of the print apparatus 200. In this example, the print media 202 is to advance, through the print apparatus 200 along a print media path between the unwind roller 204 and the print zone 201. According to this example, the print zone 201 may be parallel to the ground, when in use, and hence, as shown in FIG. 2, the print media path is from the unwind roller 204, and extends in an upwards direction and then in a horizontal direction (parallel to the ground). For example, and as shown in FIG. 2, immediately after the unwind roller 204 the print media 202 advances in an upward direction and then changes direction to advance in a horizontal direction (the horizontal advancement being propelled by the print zone roller 209). In other words, the media path comprises a region 208, e.g. a region of the print apparatus 200, at which the media 202 changes direction along the media path. The sensor 206 is provided in the region 208 of the apparatus 200 and the media path where the print media 202 changes direction. The sensor 206 in this example is provided in the region 207 of the apparatus that is between the unwind roller 204 and the print zone 201.

As the media 202 advances through the print apparatus 200 in the region 208 at which it changes direction, it exerts a force $F_t$ on a surface 212 of the print apparatus 200 and, as shown, this force may be perpendicular to the media 202 and the direction of media travel. As stated above, the placement of the sensor 206 in this region means that the sensor 206 can react to the force exerted by the media 202 and convert it into a reading that indicates the tension of the media 202. The sensor 206 in this example comprises a load sensor 206 to react to an applied force, such as the force exerted by the print media 202, and may comprise a transducer, e.g. a force transducer. In this example, the load sensor 206 is to provide a voltage output depending on an applied force. More specifically, the load sensor 206 is to provide a voltage signal, e.g. a voltage variation that is proportional to the applied force $F_t$ by the media 202 onto the sensor 206. Therefore, the sensor 206 is to determine a voltage signal that is indicative of the tension of the media 202 in the region 207 between the unwind roller 204 and the print zone 201. In some examples, the print apparatus 200 comprises a fixed portion (e.g. a portion 211 attached to a structural element of the print apparatus 200, e.g. using screws) and a movable portion (e.g. a portion 211), the movable portion being movable relative to a remainder of the print apparatus 200. The print apparatus 200 according to these examples can facilitate the media path to change throughout the apparatus 200. In these examples, a force exerted by the media onto the movable portion may cause the movable portion to move. According to such examples a portion of the sensor 206 may be attached to the movable portion of the print apparatus 200 such that it may react to the force $F_t$ exerted by the media by recording movements of the movable portion of the print apparatus 200. The sensor 206 may comprise a movable portion, or floating part, that is to react to movements of the print apparatus that are due to the force of the media. In examples where the sensor 206 comprises a transducer, the transducer may convert movements of the movable portion into the voltage signal. In some examples the media 202 may therefore be in (direct or indirect) contact with the sensor 206 such that the sensor 206 can react directly to the media force. In this example, the sensor 206 is to transmit the voltage measurement (indicative of the media tension) to a controller 250. The controller 250 is to convert (e.g. by accessing a stored database such as a look-up table) the voltage reading to a tension value in order to determine a current tension of the media 202 based on the reading from the sensor 206. In one example, the controller 250 is further to compare the determined tension to a stored tension to determine whether the determined media tension is equal to (or within a predetermined tolerance of) a stored tension, which may be a target or setpoint tension. In other words, the controller can translate the voltage signal from the sensor 206 into a back-tension measurement for the media. In another example, the controller 250 is further to compare the determined tension (based on the voltage reading from the sensor 206) to a stored range of tensions to determine whether the determined media tension is within the stored tension range, which may be a target or setpoint range of tensions. Then, if the measured tension of the media 202 (as determined by the controller 250 based on the measurement from the load sensor 206) is not within a tolerance of the target tension, or not within the target tension range, then the controller 250 may be to adjust or change the rotational speed of the unwind roller 204. For example, as described above with reference to FIG. 1, if the media tension in the region 207 is too low (slack media) then the controller 250 may be to decrease the rotational speed of the roller 204 and/or if the media tension in the region 207 is too high (taut media) then the controller 250 may be to increase the rotational speed of the roller 204.

In some examples, the apparatus 200 may comprise a further controller or printed circuit board (PCB). In these examples, the controller or PCB may be to amplify the voltage reading of the sensor 206 and to transmit the amplified voltage to the controller 250 according to which examples the controller may be to covert the amplified voltage to a tension measurement (e.g. by accessing a stored database such as a look-up table as described above). In some examples, the further controller or PCB may be to convert the (amplified or unamplified) voltage reading of the sensor 206 to a tension measurement and to transmit the determined tension to the controller 250. In this example, the controller 250 is a controller of a servomotor 270 that controls the rotation of the unwind roller 204 and the controller 250 is to calculate a difference between the measured tension of the print media, by the sensor 206, and a setpoint tension (or range of tensions) as described above, and the motor 270 (e.g. under the control of the controller 250) is to control the rotation of the unwind roller based on the calculated difference. However, in other examples the controller 250 may be a separate controller and may be separate from a motor controlling the roller 204.

In one example the servomotor 270 comprises a proportional-integral-derivative (PID) controller, for example the controller 250 may comprise a PID controller. Therefore, the servomotor 270 or controller 250 may comprise a PID control element or module. According to these examples, the motor 270, e.g. using the PID control may be to regulate the rotational speed of the unwind roller 204. For example, the sensor 206 and motor 270 and/or controller 250 with PID control may define a closed-loop process whereby the current tension of the media 202 (as measured by the sensor 206) can be used, in real time or near-real time, as a feed-forward signal by the controller 250 to affect incremental and continual, e.g. in real time or near-real time, adjustments in the rotational speed of the unwind roller 204 to maintain the media tension to within a target, or setpoint, range. According to one example, the PID controller receives, as its input, an 'error', being defined as the difference between the measured media tension (as determined by the sensor 206) and the target tension (or target range of tensions—if a range of tensions is being used then the difference may be calculated between the measured media tension and a target tension value within the range). Based on the inputted error, the PID controller is to determine a corrective voltage to drive the motor 270. More specifically, in some examples a rotating part of the motor 270, that controls the rotation of the unwind roller 204, for example the motor 270 may comprise a rotating shaft connected to the unwind roller 204 to transfer rotational motion from the motor to the roller 204, based on a voltage applied to the motor. By varying the applied voltage to the motor the rotational speed of the unwind roller may therefore be also varied. In these examples, the output of the PID controller may be a voltage that, when applied to the unwind roller 204, to achieve a target rotational speed of the roller 204 which, in turn, will achieve a target tension of the print media 202. Therefore, in some examples a controller (e.g. controller 250) is to calculate a target rotational speed of the unwind roller 204 to achieve a target tension in the print media 202. In another example, both the 'error' as defined above and the target tension may be inputs to the PID controller but the output remains a voltage correction. The voltage may be supplied to the rotating part of the motor 270 as a pulse-width-modulated (PWM) signal. In this way, the corrections to the rotational speed of the roller 204 may be achieved in an energy-efficient way.

Figure 3:
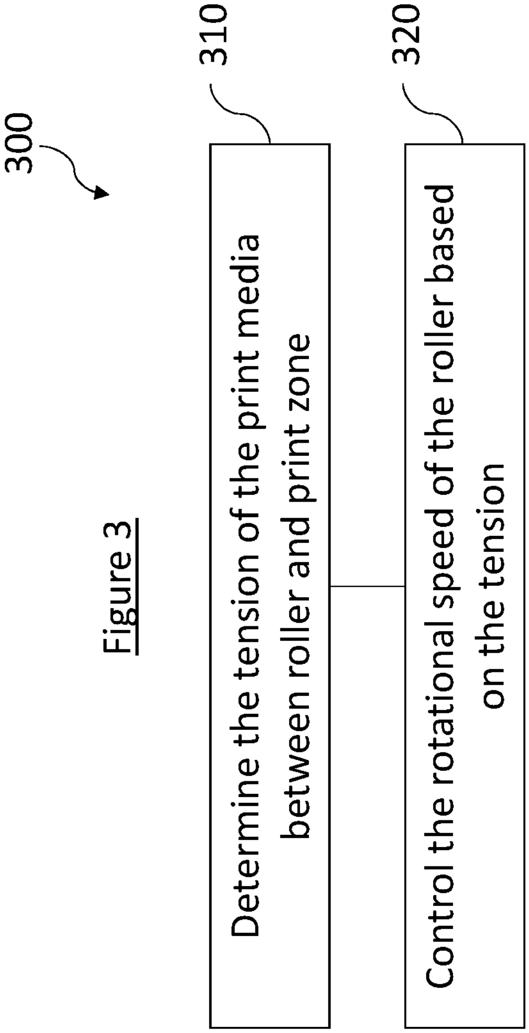
FIG. 3 is a flowchart of an example of a method of adjusting print media tension.

FIG. 3 shows an example method 300 of adjusting the tension in a print media. At block 310 the method comprises determining the tension of the print media in a region between a roller for unwinding the print media and a print zone. Block 310 may comprise measuring, e.g. by a sensor (such as sensor 106 or 206) the tension or determining, e.g. by a processor or controller (such as controller 150 or 250), the tension based on a measurement by a sensor (e.g. a voltage measurement proportional to the media force). At block 320 the method comprises controlling, e.g. by a processor, the rotational speed of the roller based on the measured tension of the print media, for example by determining a corrective voltage to be supplied as a PWM signal to a motor controlling the roller. The method 300 may be performed by the controller 150 or 250 as described above in the print apparatus 100 or 200.

Figure 4:
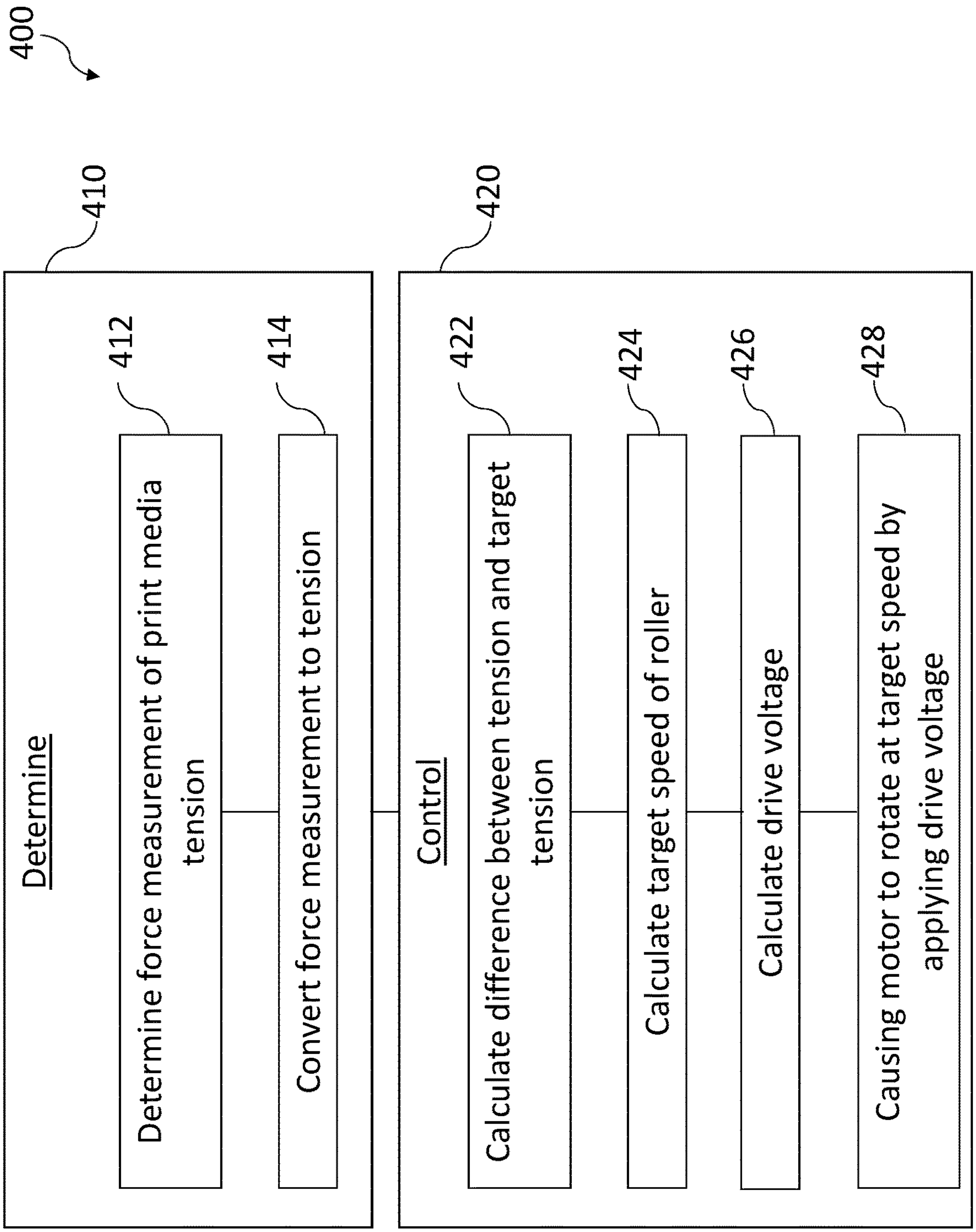
FIG. 4 is a flowchart of an example of a method of adjusting print media tension.

FIG. 4 shows another example method 400 of adjusting the tension in a print media. The method 400 may comprise the method 300 as described above with reference to FIG. 3. At block 410 the method comprises determining the tension of the print media in a region between a roller for unwinding the print media and a print zone, for example as described above with reference to block 310 of the method 300. At block 420 the method comprises controlling, e.g. by a processor, the rotational speed of the roller based on the measured tension of the print media, for example as described above with reference to block 320 of the method 400.

In the FIG. 4 example, measuring the tension, at block 410, comprises blocks 412-414 and controlling the rotation speed of the roller, at block 420, comprises blocks 422-428. At block 412, the method comprises determining, by the sensor, a measurement of the force applied by the print media onto a portion of a print apparatus and at block 414, the method comprises converting the measurement, determined at block 412, into a tension measurement for the print media. For example, block 412 may comprise using a sensor, such as a load sensor as described above, to measure the force applied by the print media, which may be measured as a voltage reading, and block 414 may comprise converting the voltage reading into a tension measurement. Therefore, block 414 may be performed by a processor such as the controller 150 or 250 as described above. The tension or force may be measured in a region of the path where the print media changes direction (e.g. the region 107 or 207 as discussed above).

Block 422 comprises calculating, e.g. by a controller or processor, the difference between the tension determined at block 410 and a target tension or range of tensions. Block 424 comprises calculating, e.g. by a processor or controller, a target rotational speed of the roller based on the determined tension (or difference, e.g. the 'error') to cause the media to be at the target tension (or within the target range), and block 426 comprises calculating, e.g. by a processor or controller, a voltage to be applied to a motor controlling the rotation of the roller to cause the motor to rotate at the target speed (calculated at block 424). Block 428 comprises causing the motor to rotate at the target speed, e.g. by applying the voltage calculated at block 424, for example in a PWM signal. Block 428 therefore comprises causing the unwind roller to rotate at a speed to achieve a target tension in the media. Blocks 426 and/or 428 may be performed by a PID controller or PID control module of a controller.

Figure 5:
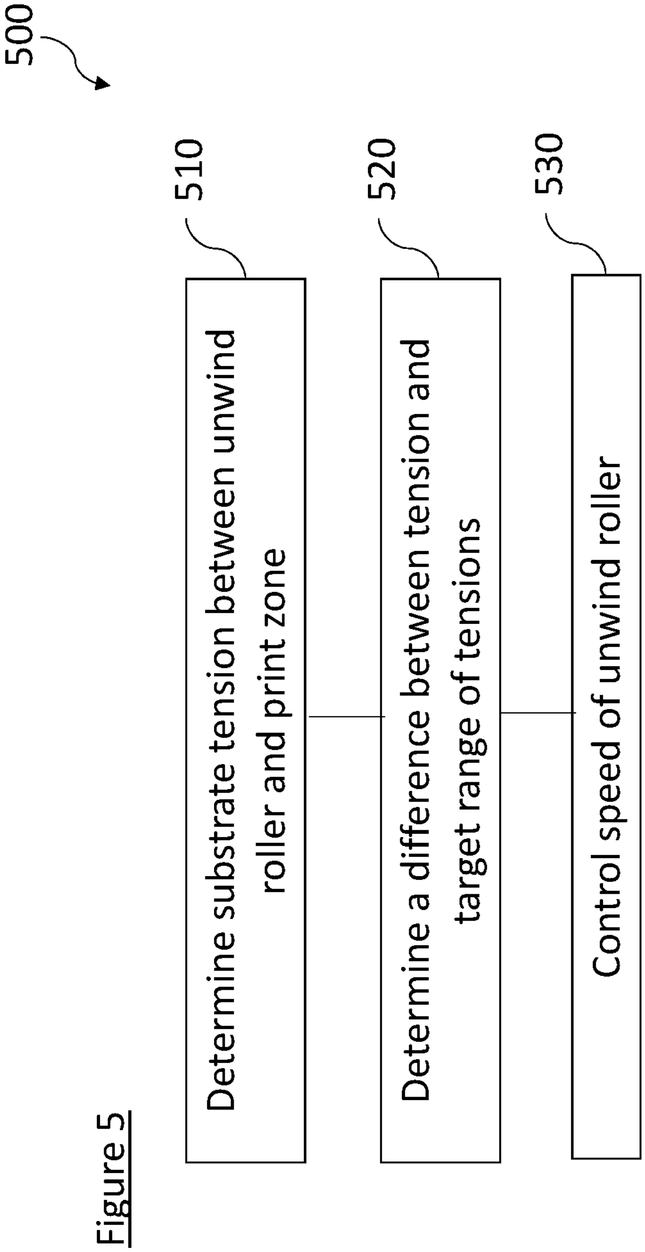
FIG. 5 is a flowchart of an example of a method.

FIG. 5 shows a method 500 which may comprise a method of controlling or adjusting the tension in a substrate and/or which may comprise a method of controlling or adjusting the rotational speed of a roller for unwinding a substrate. Method 500 may comprise a computer-implemented method. The method 500 may be performed and/or implemented by the controller 150 or 250 as described above with reference to FIGS. 1 and 2. In other words, each of the blocks of the method may be At block 510, the method comprises determining, by a controller, a substrate tension in a region of the substrate between an unwind roller for the substrate and a print zone roller to advance the substrate toward a print zone. Block 510 may comprise determining a measure of force applied by the substrate, e.g. to a portion of a print apparatus (e.g. a voltage) and using that to determine the substrate tension. Block 510 may comprise receiving a signal indicating the substrate tension (e.g. a voltage signal). At block 520, the method comprises determining, by a controller, a difference between the determined tension and a target range of tensions. At block 530, the method comprises controlling, by a controller, the rotational speed of the unwind roller based on the difference.

Figure 6:
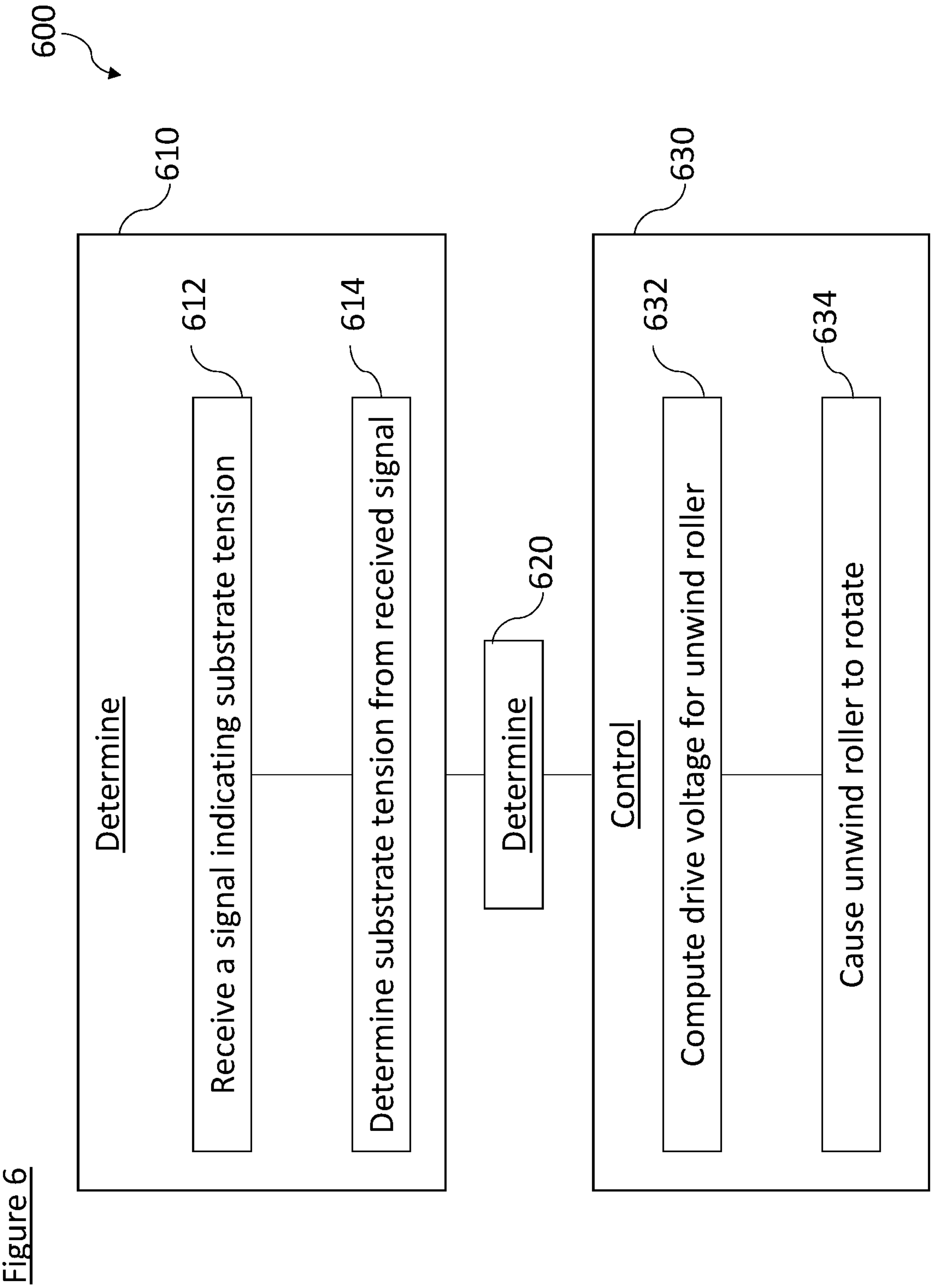
FIG. 6 is a flowchart of an example of a method.

FIG. 6 shows a method 600 which may comprise the method 500 as described above. At block 610, the method comprises determining, by a controller, a substrate tension in a region of the substrate between an unwind roller for the substrate and a print zone roller to advance the substrate toward a print zone. Block 610 comprises blocks 612 and 614. At block 612, the method comprises receiving a signal indicating the substrate tension. For example, block 612 may comprise receiving a signal from a sensor (such as a load sensor, e.g. sensor 106 or 206), such as a voltage signal that indicates the tension of the substrate (or, in some examples, that indicates the force applied to the sensor which indicates the tension of the substrate). At block 614, the method comprises determining the substrate tension based on the signal received at block 612. For example, if at block 612 a voltage signal is received indicating the force applied by the substrate then block 614 may comprise determining (e.g. by accessing a lookup table) a substrate tension based on the received voltage signal.

At block 620, the method comprises determining, by a controller, a difference between the determined tension and a target range of tensions.

At block 630, the method comprises controlling, by a controller, the rotational speed of the unwind roller based on the difference. Block 630 comprises blocks 632 and 634. At block 632, the method comprises computing a drive voltage for driving the unwind roller based on the difference determined at block 620. Block 634 comprises causing the unwind roller to rotate but driving it with the voltage determined at block 632. For example, block 632 and 634 may be performed by a PID-portion of the controller performing the method 600. Block 634 may comprise applying a voltage signal as a PWM signal to a motor driving the unwind roller.

Examples in the present disclosure can be provided as methods, systems or machine readable instructions, such as any combination of software, hardware, firmware or the like. Such machine readable instructions may be included on a computer readable storage medium (including but is not limited to disc storage, CD-ROM, optical storage, etc.) having computer readable program codes therein or thereon.

The present disclosure is described with reference to flow charts and/or block diagrams of the method, devices and systems according to examples of the present disclosure. Although the flow diagrams described above show a specific order of execution, the order of execution may differ from that which is depicted. Blocks described in relation to one flow chart may be combined with those of another flow chart. It shall be understood that each flow and/or block in the flow charts and/or block diagrams, as well as combinations of the flows and/or diagrams in the flow charts and/or block diagrams can be realized by machine readable instructions.

The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus functional modules of the apparatus and devices may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate array etc. The methods and functional modules may all be performed by a single processor or divided amongst several processors.

Such machine readable instructions may also be stored in a computer readable storage that can guide the computer or other programmable data processing devices to operate in a specific mode.

Such machine readable instructions may also be loaded onto a computer or other programmable data processing devices, so that the computer or other programmable data processing devices perform a series of operations to produce computer-implemented processing, thus the instructions executed on the computer or other programmable devices realize functions specified by flow(s) in the flow charts and/or block(s) in the block diagrams.

Further, the teachings herein may be implemented in the form of a computer software product, the computer software product being stored in a storage medium and comprising a plurality of instructions for making a computer device implement the methods recited in the examples of the present disclosure.

While the method, apparatus and related aspects have been described with reference to certain examples, various modifications, changes, omissions, and substitutions can be made without departing from the spirit of the present disclosure. It is intended, therefore, that the method, apparatus and related aspects be limited only by the scope of the following claims and their equivalents. It should be noted that the above-mentioned examples illustrate rather than limit what is described herein, and that those skilled in the art will be to design many alternative implementations without departing from the scope of the appended claims.

The word "comprising" does not exclude the presence of elements other than those listed in a claim, "a" or "an" does not exclude a plurality, and a single processor or other unit may fulfil the functions of several units recited in the claims.

The features of any dependent claim may be combined with the features of any of the independent claims or other dependent claims.

The invention claimed is:

1. A method of adjusting the tension in a print media, the method comprising:

determining the tension of the print media in a region between a roller for unwinding the print media and a print zone;

controlling the rotational speed of the roller based on the determined tension of the print media, wherein measuring, by the sensor, the tension of the print media comprises measuring a perpendicular force applied by the print media onto a portion of a print apparatus in a region of the path where the print media changes direction.

2. The method according to claim 1, wherein determining, by the sensor, the tension of the print media comprises measuring a force applied by the print media onto a portion of a print apparatus.

3. The method according to claim 1, wherein the print media is to advance toward the print zone along a path and wherein measuring, by the sensor, the tension of the print media comprises measuring the tension of the print media in a region of the path where the print media changes direction.

4. The method according to claim 1, wherein the print media is to advance toward the print zone along a path.

5. The method of claim 1, further comprising calculating the difference between the determined tension and a target tension of the print media.

6. The method of claim 1, wherein controlling the rotational speed of the roller comprises calculating a target rotational speed of the roller based on the determined tension and causing the roller to rotate at the target speed.

7. The method of claim 6, further comprising calculating, based on the determined tension, a voltage for a motor controlling the rotation of the roller, to cause the motor to rotate the roller at the calculated target rotational speed.

8. A print apparatus comprising:

a print zone;

a rotatable unwind roller to unwind a print media toward the print zone;

a sensor to measure the tension of the print media in a region between the unwind roller and the print zone;

a controller to control the rotational speed of the unwind roller based on the print media tension measured by the sensor, wherein the sensor comprises a load sensor to measure a perpendicular force applied to a portion of the print apparatus by the print media.

9. The print apparatus of claim 8, further comprising a media path along which the print media is to advance between the unwind roller and the print zone, wherein the sensor is provided in a region of the media path where the print media changes direction.

10. The print apparatus of claim 8 further comprising a motor to control the rotation of the unwind roller, wherein the controller is to calculate a difference between the measured tension of the print media, by the sensor, and a setpoint tension, and wherein the motor is to control the rotation of the unwind roller based on the calculated difference.

11. A method comprising:

determining, by a controller, a substrate tension in a region between an unwind roller for the substrate and a print zone roller to advance the substrate toward a print zone;

determining, by a controller, a difference between the determined tension and a target range of tensions; and controlling, by a controller the rotational speed of the unwind roller based on the difference, wherein determining the tension comprises determining a measure of a perpendicular force applied by the substrate on a print apparatus.

12. The method according to claim 11, wherein determining the substrate tension comprises receiving a signal indicating the substrate tension.

13. The method according to claim 11, wherein controlling the rotational speed of the unwind roller comprises computing a voltage for driving the unwind roller based on difference.

* * * * *